US005954773A

United States Patent [19]

Luper

[11] Patent Number: 5,954,773

[45] Date of Patent: Sep. 21, 1999

[54] VEHICLE STATE MILEAGE DETERMINATION SYSTEM

[75] Inventor: Jack F. Luper, Winston-Salem, N.C.

[73] Assignee: Eaton Corporation, Cleveland, Ohio

[21] Appl. No.: 08/763,375

[22] Filed: Dec. 13, 1996

[51] Int. Cl.[6] ............................ G06F 7/00; G06F 19/00

[52] U.S. Cl. ........................... 701/35; 701/201; 701/207; 701/213; 701/225; 340/438

[58] Field of Search ............................ 701/13, 29, 35, 701/201, 202, 207, 213–216, 225; 340/988, 990, 995, 438

[56] References Cited

U.S. PATENT DOCUMENTS 5,359,528 10/1994 Haendel et al. ......................... 701/35

5,612,875 3/1997 Haendel et al. ......................... 701/35

*Primary Examiner*—William A. Cuchlinski, Jr.
*Assistant Examiner*—Getrude Arthur
*Attorney, Agent, or Firm*—Charles E Kosinski

[57] ABSTRACT

A system and method for monitoring and recording the number of miles that a vehicle has traveled within each of a set of geographic entities. Current vehicle location data points are compared to entity boundary line approximations to determine which of a set of entities the location point falls within. Once an entity has been confirmed for a given location point obtained, the incremental mileage traveled by the vehicle since the previous location point was obtained is added to an accumulated mileage value for that entity.

19 Claims, 4 Drawing Sheets

VEHICLE STATE MILEAGE DETERMINATION SYSTEM

BACKGROUND AND SUMMARY OF THE INVENTION

The present invention relates generally to on-board vehicle systems and, more particularly, to a system and method for determining which state a vehicle is presently in and for monitoring, recording and reporting the mileage driven by a vehicle in a particular state.

With the advent of vehicle fleet management and monitoring systems, elaborate computerized communication systems directed at automatically obtaining and recording vehicle location and a wide variety of other information as a vehicle covers its route, numerous on-board computer systems have evolved. The information collected by these systems can be used for a myriad of purposes which encompass automated customer billing systems, computerized dispatching, trip reporting and other such tasks. One type of information available from an on-board vehicle computer is the present location of the vehicle in terms of its geographic latitude and longitude coordinates. One particularly prevalent way of obtaining this data is through a global positioning system (GPS) receiver which captures positional information from signals transmitted over satellite.

However, oftentimes it is necessary to convert the raw coordinate data into a more useful form which provides additional information such as what state, city, province, county or other defined geographical territory the vehicle is traveling in. This information is particularly useful in various fleet and trucking applications such as in performing automated road use tax calculations as well as various trip reporting functions. However, even when coordinate data for the boundary lines of various geographic entities has been pre-stored in memory, the process of individually comparing the current location coordinates to boundary coordinate data for each entity, in order to determine whether the current point lies within that boundary, can become quite computer intensive.

The vehicle state mileage determination system of the present invention includes an on-board processor having stored in memory thereof ordered coordinate data points defining the boundary line of each of a set of geographic entities. Associated with each entity is an additional ordered set of data points which can be joined to form an imaginary polygon which substantially encloses the entity's border.

Each vehicle location coordinate data point acquired by the vehicle position determining system is compared with the boundary line data associated with the last entity the vehicle was determined to be traveling in. If the vehicle location point is determined to fall within that entity's boundary, an OBC memory location for accumulating the mileage traveled by the vehicle with that entity is updated with the distance traveled by the vehicle since the last mileage calculation update. If, however, the new location point does not fall within the entity boundary, the point is then compared to the polygon-forming points associated with certain other entities.

For an imaginary polygon having the new vehicle location point falling therewithin, the point is then compared to the associated entity boundary to confirm whether or not the location point falls within the subject entity border. If it does not, additional entities are checked until an entity location can be positively confirmed. As each entity location is confirmed, the incremental mileage traveled by the vehicle since the last update is added to a value stored in OBC memory representing the cumulative mileage traveled by the vehicle within that entity.

The present system and method thus provide a more convenient and faster way to determine the state, or other such geographic entity, in which a vehicle is located given its latitude and longitude coordinates. The data is continually updated and stored, enabling the creation of an automated database which requires no manual interaction. Data processing and storage are kept to a minimum to make this system effective in an on-board application.

These and other features and advantages of the present invention will become apparent upon review of the following description taken in conjunction with the accompanying drawings.

DETAILED DESCRIPTION OF THE PREFERRED EMBODIMENT

Figure 1:
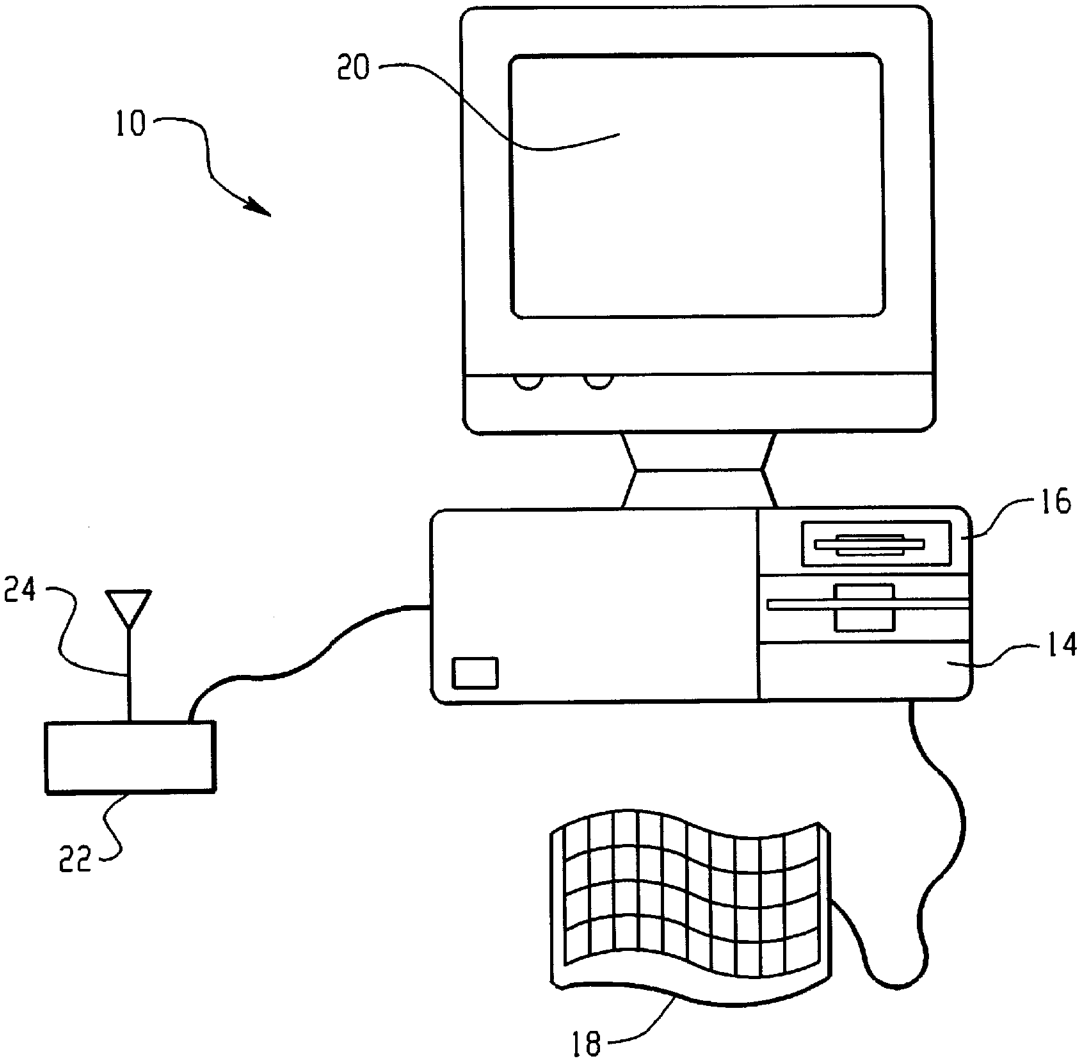
FIG. 1 is a schematic view of the hardware components of the present invention.

Turning now to the drawings, and in particular to FIG. 1, a system made in accordance with the present invention is indicated generally at 10. System 10 includes a microprocessor-based on-board computer (OBC) 12, preferably installed in the passenger compartment of a vehicle (i.e. a truck cab) and positioned to provide convenient interaction with the driver and/or passenger of the vehicle. OBC 12 is preferably configured and packaged so as to provide reliable operation in a vehicle cab environment and includes memory means 14, preferably both read only memory (ROM) and random access memory (RAM). OBC 12 also includes one or more auxiliary data storage means, such as a PCMCIA card reader 16, and a means for providing interactive communication with a user, preferably including a touch screen or keyboard 18 and a visual display 20. OBC 12 also includes, or alternatively is coupled to, a transceiver 22 for receiving data via an antenna 24 from a transmitter which provides geographical location data, such as from a GPS satellite (not shown) or other location determination system such as Loran.

Stored in memory 14 of OBC 12 is coordinate data indicative of the borders of each of a set of geographical entities. While each of these entities for purposes herein will hereinafter be referred to as "state", it should become readily apparent that the system and method of the present invention are equally well suited for uses involving other types of geographic entities as well, such as countries, counties, cities or any other type of defined geographic territories. Each "state" border is preferably represented as a closed polygon formed of a plurality of connected line segments. In this exemplary embodiment, the vertices formed at points where two segments meet are each stored as an x-y coordinate pair in an Albers Equal-Area Conic projection system. However, using this format requires a conversion if the system used for position data input is a GPS system or otherwise provides data in the form of latitude and longitude coordinates. While this data format is the one preferred for the present invention, it should become readily apparent and well known to those working in the art that any other convenient data format could alternately be utilized.

For the preferred implementation of the present invention, this state boundary data is stored in memory 14 in five object classes, the first being a "point", preferably an x,y coordinate although another suitable coordinate representation could alternately be used. The second object class is a "line segment", which contains an ordered sequence of points which represent a portion of a state border which may or may not be shared with another state. Some line segments may contain only two points, some may contain several hundred points. As a result, a line segment is preferably implemented using a count of the number of points and a pointer to an array of points. A third object class is the "segment table" which contains an array of line segments. A line segment table could contain all the line segments needed to construct the boundary of a single state, a group or subset of states, or all states.

A "state" object contains a list of integer indices to a line segment table. By following these indices into the line segment table, the exact points defining a particular state's boundary can be extracted. These indices are preferably positive in sign to indicate that the corresponding line segment should be followed in the forward direction and negative to indicate that the corresponding line segment should be followed in the reverse direction in order to construct a state's border. Each state file also includes x,y coordinate extremes of a bounding rectangle.

The fifth object is a "state location" object which includes a "line segment table" containing all the state border data available. It also keeps track of the last point successfully located and a "state" object for the most recent state identified containing a list of all the points making up the border of that state. This list is of critical importance in determining whether or not a point is contained in a particular state. While this data storage structure has been implemented in the exemplary embodiment of the present invention described herein, a number of alternative data organization schemes should also be apparent to one of skill in the art.

To minimize data storage requirements, especially with an on-board implementation, as well as to improve efficiency and speed, the state boundary data and associated rectangle coordinate points can be further segmented and organized. The data can be segmented into "regions" or state subsets, and if desired only that subset of states which the application will need to access can be loaded on-board for storage into memory 14, rather than loading all of the available state boundary information. This is particularly useful where a vehicle may have a route which includes only a specific region of the country or a specific set of states. The selected subsets could be changed as needed, loading other subsets or all the data in from a suitable auxiliary storage means, such as CD ROM or disk, or by downloading. Preferably, a choice of regions would be presented to a user in the form of a graphical display constructed from the various regions and state boundary line data and implemented in a manner well known to those of skill in the art.

In addition, any number of data compression schemes known to those of skill in the art can also be used, but any such scheme must be simple and fast since the data must be extracted and utilized quickly in the final onboard implementation. For instance, a scheme based on the acceptable tolerance level for the system can be employed, creating a tradeoff between precision and data set size which is directly controllable by the user. A user may specify the acceptable level at which the loss of resolution can be tolerated, preferably expressed in a convenient form such as in terms of meters. If a tolerance of 200 meters is acceptable, for example, all coordinate boundary points within 200 meters of a straight line connecting the neighboring points on either side of that point are eliminated from the data set.

Figure 2:
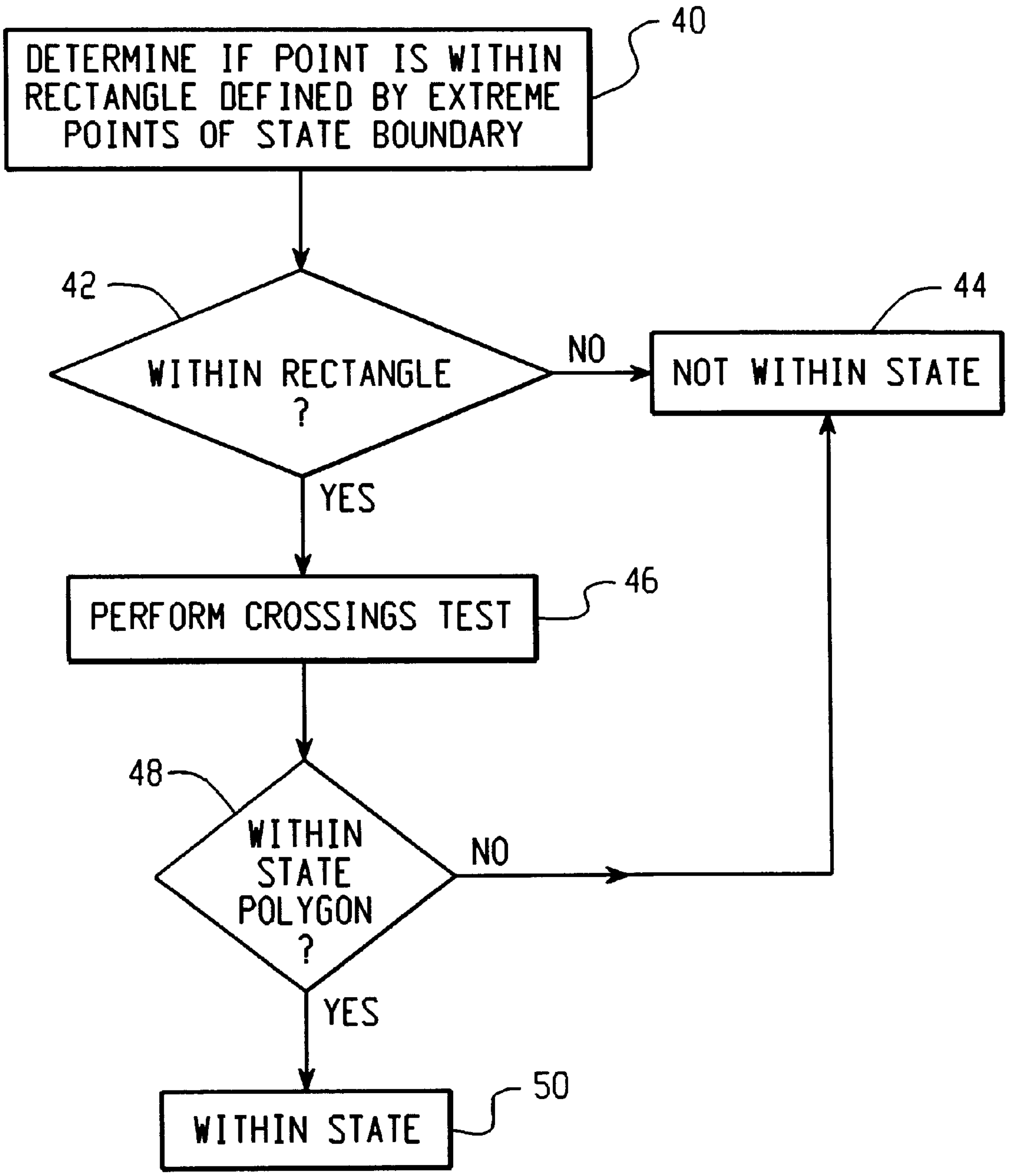
FIG. 2 is a flow chart illustrating the method by which the system shown in FIG. 1 determines whether a given point lies within the boundary of a certain geographical entity such as a state.

Turning now to FIG. 2, the method by which OBC 12 determines whether a vehicle location point lies within the boundary of any given state is illustrated by flow chart. This method is preferably performed utilizing software running on OBC 12 but could also be done remotely by transferring data as needed between OBC 12 and a central computer (not shown) or using any other suitable means. Beginning at block 40 with current position point acquired through transceiver 22, OBC 12 converts the acquired point into an appropriate coordinate system (if required) and then checks to see if the current point falls within a rectangle defined approximately by extreme points of a state boundary, the particular state being chosen as set forth in detail below.

The extreme points for a particular state are preferably chosen so that the rectangle created thereby completely encompasses the given state's boundary. These points are preferably stored in the state object. Since many states have very irregular borders, it is likely that the imaginary rectangles may overlap and a given vehicle location point will fall within the rectangle defined for more than one state. However, this stage is mainly an approximation, directed primarily at eliminating states from consideration.

If the point is not found to be in the rectangle defined for a particular state in decision block 42, an indication that the point is not within the given state is given at block 44 and this information is used in another part of the routine as will be described below. Although a rectangle is utilized in the presently preferred embodiment described herein, and is the most convenient shape for use with a rectangular coordinate system since only two points are needed to define a rectangle, any other convenient polygonal shape could also be used, such as a triangle or hexagon. Various types of polygons could also be used in a single system with an appropriate polygonal shape being selected to best encompass a given state's border.

If, however, a present vehicle location point is determined to be within the bounds of the selected rectangle in decision block 42, a "crossings test" is performed at 44 to make a more definite determination as to whether the present point lies within the boundary of the suggested state. This test is one known to those of skill in the art wherein a ray is constructed in an arbitrary cardinal direction from the point being tested. If that ray crosses the state border an odd number of times, the point is determined to fall within that state. If, on the other hand, the number of crossings is even, the point is determined to not be within the state. While this is the method used in the presently preferred embodiment described herein, any other similar method known to those of skill in the art could alternately be used.

This state determination method is advantageous in that the rectangle test is fast and requires only a few simple comparisons. Although for the crossings test the data representing the state border may contain hundreds of line segments, the test can be implemented in such a way that it is extremely efficient, taking only a fraction of a second to test a single state. Borders of adjacent states preferably include the same collection of points where the states touch and each border preferably forms a continuous closed loop.

Gaps in the border data could cause an error with the crossings test while gaps between borders could create a situation where a vehicle is determined to be "between" adjacent states.

Figure 3:
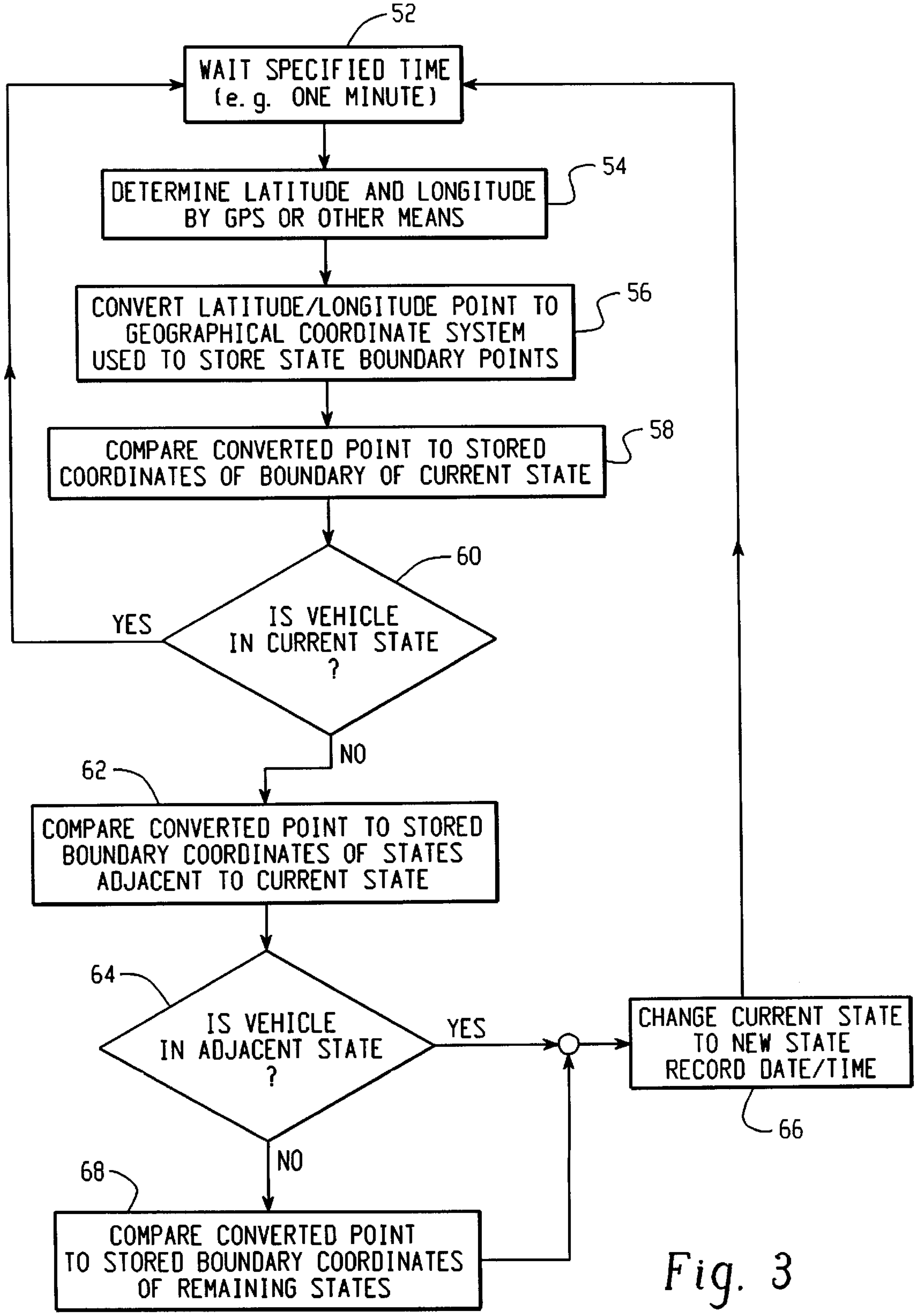
FIG. 3 is a flow chart similar to that in FIG. 2 illustrating a method by which the current state is determined.

Turning now to the flow chart of FIG. 3, the process of monitoring the state in which a vehicle is traveling begins at block 52 wherein a specified time period is allowed to expire, this period being about one minute in this exemplary embodiment but alternately being any convenient amount depending upon the system accuracy desired. At block 54 a current position reading is obtained. This reading can be received through transceiver 22 from a global positioning system (GPS) or any other convenient means and may be in the form of latitude and longitude, or in any other available format. In the present embodiment, the point data received from the GPS system is in the form of latitude/longitude and is converted into the coordinate system in which the state boundary line coordinates are stored at 56.

At block 58, the method illustrated in FIG. 2 is performed, wherein it is determined whether the vehicle is in the current state, i.e. the same state as it was during the previous iteration of this routine. If the vehicle is in the same state at decision block 60, control returns to block 52 and the process repeats upon the expiration of the set time period, until it is determined at block 60 that the vehicle has moved into another state. If this is the case, additional states are selected and the process of FIG. 2 is repeated using the newly selected states until a new current state is confirmed at block 62. Preferably adjacent states are selected but the selected states may be determined according to any appropriate method known or obvious to one having requisite skill in the art. The selection of additional states to be tested can also be further narrowed by utilizing other available information such as the general direction the vehicle was heading or the point at which a state boundary line was crossed.

If the vehicle, as indicated by the present location point, is found to be in the suggested adjacent state at decision block 64, the adjacent state becomes the current state and OBC 12 records additional associated information such as the date and time. If the present position point is not found to be in a given adjacent state at decision block 64, the process of FIG. 2 is again carried out with additional states until a new state is found and confirmed. If a new state is never confirmed, an appropriate error handling routine known to those of skill in the art can be employed. For instance, all states for which data is available may be checked in order. If no state is found, the present position data point is compared to a previously verified point. If the new point is within a certain distance, say 800 meters, of the previous point, it is assumed that the vehicle is still in the same state as the previous point. The only reason, generally, that this test needs to be used, is to overcome errors caused by small gaps between border lines for neighboring states. Such an error handling routine is preferably implemented as part of software block 68.

Figure 4:
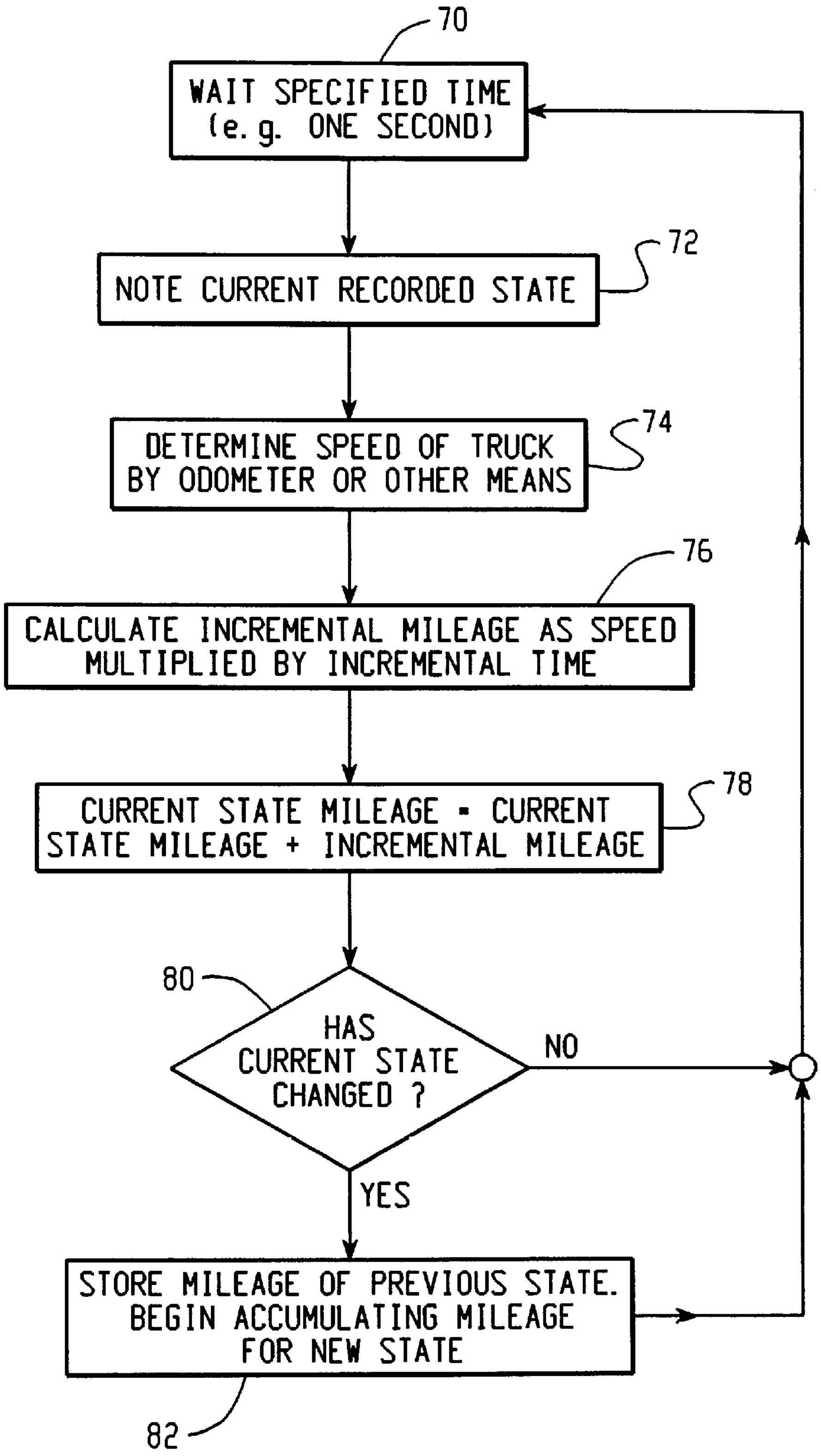
FIG. 4 is a flow chart illustrating a preferred method by which the present system records and reports the total mileage traveled by a vehicle within a given state.

FIG. 4 shows the method by which, given an identified state that a vehicle is in, OBC 12 records the mileage driven by the vehicle within that state. After a specified period of time expires at block 70, the current state is noted at block 72. The speed of the vehicle is obtained by OBC 12 at 74, such as by using the vehicle's speedometer or other readily available means. An incremental mileage is calculated at 76 as the sensed speed multiplied by incremental time (i.e. the time expired since the last measurement was taken). While speed will vary somewhat, especially in a city, by keeping the time period of block 70 sufficiently small, overall system accuracy can be controlled. A current state mileage value, preferably stored in an addressable register of OBC 12, is updated in block 78 as the current mileage plus the incremental mileage found in block 76. Alternately, however, any other suitable method for keeping track of vehicle mileage, such as by using information provided by the vehicle's odometer could also be used.

At decision block 80, OBC 12 checks to determine whether the current state has changed since the previous iteration of this routine. If it has not, the above-described process is repeated and the mileage for that state continues to accumulate. However, once the state has changed, the mileage traveled in the previous state is stored and the mileage counter zeroed out so as to begin incrementing again as the vehicle travels in the new state. In addition to calculating mileage as an alternative, the present system could keep track of the time elapsed during travel within a particular state or any other parameter deemed to be of interest. The accuracy of the information obtained is directly related to that of the various sensors employed as well as the time period of block 70.

The methods by which the various types of data gathered by this system are utilized can vary from system to system. For instance, in one preferred implementation of the present invention, all calculations are made on-board the vehicle using boundary line data stored in OBC memory. The mileage accumulated for each state can be stored on-board or transmitted via antenna 24 to a ground station for use and/or long term storage. Alternately, however, the data could be retained on-board for subsequent transfer to another computer using a batch storage device such as PCMCIA card or disk. Any or all OBC tasks could instead be performed off-board by another computer having the state boundary information stored therein and simply transmitting the vehicle location data to that computer. Obviously, a wide variety of variations and system configurations are possible within the confines of the present invention.

Thus, the system and method of the present invention provide an effective way to keep track of mileage driven by a vehicle in each of a number of states. The calculations are kept to a minimum to achieve results without requiring elaborate hardware or extensive software operations. Accuracy can be directly controlled and increased by manipulating certain set time periods to update the recorded information more often.

The foregoing discussion discloses and describes merely an exemplary embodiment of the present invention. One skilled in the art will readily recognize from such discussion, and from the accompanying drawings and claims, that various changes and modifications can be made therein without departing from the spirit and scope of the present invention as defined by the following claims.

What is claimed is:

1. A method for monitoring and recording the number of miles that a vehicle has traveled within each of a set of predefined geographic entities wherein the location of said vehicle and the boundaries of said entities can be defined by coordinate data points in a common coordinate system, said method comprising the steps of:

for each said geographic entity:

storing a set of ordered coordinate data points representing the boundary of said entity;

storing at least three coordinate data points wherein said points can be joined to form an imaginary polygon which substantially encloses said geographic entity boundary; and providing a storage location for storing the accumulated mileage traveled by said vehicle within the boundary of said entity;

providing a geographic position sensing means on-board said vehicle, said position sensor for providing an electrical signal including a present vehicle position coordinate data point which is indicative of the present geographical location of said vehicle; and for each present vehicle location coordinate data point:

comparing said location point to a set of said polygon coordinate data points to determine whether said location point lies on or within a said imaginary polygon;

for a polygon having said location point lying thereon or therein, comparing said location point to said boundary coordinate data points for said entity to determine whether said location point lies on or within said entity boundary; and for a location point lying on or within said entity boundary, determining incremental mileage traveled by said vehicle and adding said incremental mileage to said stored accumulated mileage for said entity.

2. The method of claim 1 wherein said location point is first compared to a set of said polygon coordinate data points corresponding to a previously confirmed entity having an entity boundary on or within which the previous location point was determined to exist.

3. The method of claim 2 wherein for a location point not lying on or within said previously confirmed entity boundary, checking additional polygons of entities adjacent said previously confirmed entity.

4. The method of claim 1 wherein said imaginary polygon is a rectangle.

5. The method of claim 1 wherein said at least three coordinate data points comprises substantially fewer data points than said set of boundary coordinate data points.

6. The method of claim 1 wherein said at least three coordinate data points comprise the coordinate extremes of said boundary coordinate data points of an entity.

7. A system for monitoring and recording the number of miles that a vehicle has traveled within each of a set of predefined geographic entities wherein the location of said vehicle and the boundaries of said entities can be defined by coordinate data points in a common coordinate system, said system for monitoring and recording comprising:

a vehicle position determination system installed on-board said vehicle for generating a present vehicle location point;

a memory, said memory storing for each said entity:

a set of ordered coordinate data points representing the boundary of said entity;

at least three coordinate data points wherein said points can be joined to form an imaginary polygon which substantially encloses said geographic entity boundary; and the accumulated mileage traveled by said vehicle within the boundary of said entity;

a device for calculating the mileage traveled by said vehicle; and a processor coupled with said position determination system and said memory for comparing said present vehicle location point to at least one set of said polygon coordinate data points and for a said polygon having said location point lying therein, comparing said location point to said boundary coordinate data points for the entity corresponding to said polygon and, if said location point lies on or within said boundary, adding the incremental mileage traveled by said vehicle to said memory.

8. The system of claim 7 further comprising a transceiver and antenna coupled to said position determination system for transmitting said present vehicle location point to an off-board computer.

9. The system of claim 7 further comprising a transceiver and antenna coupled to said processor for transmitting processor results to an off-board computer.

10. The system of claim 7 wherein said position determination system is a global positioning system.

11. The system of claim 7 wherein said at least three coordinate data points comprises substantially fewer data points than said set of boundary coordinate data points.

12. The system of claim 7 wherein said at least three coordinate data points comprise the coordinate extremes of said boundary coordinate data points of an entity.

13. The system of claim 7 wherein said imaginary polygon is a rectangle.

14. A system for monitoring the travel of a vehicle within a set of predefined geographic entities and determining in which of the entities the vehicle is presently located, wherein the location of said vehicle and the boundaries of said entities can be defined by coordinate data points in a common coordinate system, said system comprising:

a vehicle position determination system installed on-board said vehicle for generating a present vehicle location point;

a memory, said memory storing for each said entity a set of ordered coordinate data points representing the boundary of said entity, and at least three coordinate data points wherein said points can be joined to form an imaginary polygon which substantially encloses said geographic entity boundary; and a processor coupled with said position determination system and said memory for comparing said present vehicle location point to at least one set of said polygon coordinate data points and for a said polygon having said location point lying therein, comparing said location point to said boundary coordinate data points for the entity corresponding to said polygon.

15. The system of claim 14 wherein said at least three coordinate data points comprise the coordinate extremes of said boundary coordinate data points of an entity.

16. The system of claim 14 wherein said at least three coordinate data points comprises substantially fewer data points than said set of boundary coordinate data points.

17. The system of claim 14 wherein said imaginary polygon is a rectangle.

18. The system of claim 14 further comprising a transceiver and antenna coupled to said position determination system for transmitting said present vehicle location point to an off-board computer.

19. The system of claim 14 wherein said position determination system is a global positioning system.

* * * * *